United States Patent [19]
Dahlin et al.

[11] Patent Number: 5,922,420
[45] Date of Patent: Jul. 13, 1999

[54] CHEMICALLY MODIFIED WOOD

[75] Inventors: Jörgen Dahlin, Falund; Ulf Nyberg, Österskär, both of Sweden

[73] Assignee: Stora Kopparbergs Bergslags AB, Falun, Sweden

[21] Appl. No.: 08/776,749

[22] PCT Filed: Aug. 15, 1995

[86] PCT No.: PCT/SE95/00925

§ 371 Date: Feb. 13, 1997

§ 102(e) Date: Feb. 13, 1997

[87] PCT Pub. No.: WO96/05953

PCT Pub. Date: Feb. 29, 1996

Related U.S. Application Data

[30] Foreign Application Priority Data

Aug. 22, 1994 [SE] Sweden .................................. 9402795

[51] Int. Cl.$^6$ ................................ B32B 5/16; C08L 1/10; C09F 1/04
[52] U.S. Cl. ........................ 428/15; 106/162.7; 428/402; 428/407; 428/511; 428/512; 428/537.1; 530/207; 530/215; 530/217
[58] Field of Search .................................... 428/327, 407, 428/402, 537.1, 511, 512, 15; 106/162.7; 530/215, 217

[56] References Cited

U.S. PATENT DOCUMENTS

| | | | |
|---|---|---|---|
| 4,376,187 | 3/1983 | Theodore et al. | 525/123 |
| 4,394,486 | 7/1983 | Chattha et al. | 525/162 |
| 5,055,247 | 10/1991 | Ueda et al. | 264/109 |

FOREIGN PATENT DOCUMENTS

| | | |
|---|---|---|
| 58-7308 | 1/1983 | Japan . |
| 58-7309 | 1/1983 | Japan . |
| 58-7310 | 1/1983 | Japan . |
| WO-96-05953 | 2/1996 | WIPO . |

OTHER PUBLICATIONS

"Chemical Treatment of Wood With a Maleic Acid and Glycerol Mixture", International Symposium on Chemical Modification of Wood, H. Fujimoto et al., May 17–18, 1991, Kyoto, Japan, pp. 83–91.

Dialog Information Services, File 240, Paperchem, Dialog Accession No. 445326, Paperchem No. 59–05326, Matsuda, H. et al., "Preparation and Crosslinking of Oligoesterified Woods Based on Maleic Anhydride and Ally Glycidyl Ether", Wood Science Technol. (NY) 22, No. 1: 21–32 (1988).

Dialog Information Services, File 351, Derwent WPI, Dialog Accession No. 003957827, WPI Accession No. 84–103371/17, Okura Industrial KK: "Esterfied Wood Prepn. By Reacting Dried Wood Particles with Polybasic Acid Anhydride Without Solvent", & JP 5903313, 840222, 8417 (Basic) and Patent Abstracts of Japan, vol. 8, No. 132, (M–303) Abstracts of Japan 59–33133, publ. Feb. 22, 1984 Inventors: Minoru Ueda et al.

Dialog Information Services, File 351, Derwent WPI, Dialog Accession No. 003790238, WPI Accession No. 83–786470/41, Okura Industrial KK: "Esterfied Wood Mfr. by Reacting Small Pieces of Wood with Polycarboxylic Acid Anhydridel in Non–Protonic Polar Solvent in Basic Catalyst Presence", & JP 58148747, 830903, 8341 (Basic) and Patent Abstracts of Japan, vol. 7, No. 269, (M–259) Abstracts of Japan 58–14847, publ. Sep.3, 1983. Inventors: Minoru Ueda et al.

Patent Abstracts of Japan, vol. 9, No. 194, M–403, Abstract of Japanese Publication No. 60–58802, "Preparation of a Modified Wood Piece", Inventors: Minoru Ueda et al., Applicant: Okura Kogyo Kabushiki Kaisha, Published: Apr. 5, 1985.

Dialog Information Services, File 351, Derwent WPI, Dialog Accession NO. 004323555, WPI Accession No. 85–150433/25, Okura Industrial KK: "Modified Wood Pieces Prepn. by Addn. Esterification of Wood Pieces to Obtain Carboxyl Gp. Contg. Esterified Wood Pieces", & JP 60083806, 850513, 8525 (Basic) and Patent Abstracts of Japan, vol. 9, No. 266, (M–412) Abstracts of Japan 60–83806, publ. May 13, 1985. Inventors: Minoru Ueda et al.

*Primary Examiner*—Hoa T. Le
*Attorney, Agent, or Firm*—Burns, Doane, Swecker & Mathis, L.L.P.

[57] ABSTRACT

A granulate of wood or some other cellulose-containing material, pieces or particles of said material being at least partially esterified with 10–50% of a dicarboxylic acid anhydride and then impregnated with 2–25% of a polyol, the granulate being stable in storage and being possible to hot press or hot form later. A method for preparing the granulate by esterification at 80–160° C. and, subsequently, impregnation at 150° C. at most. A method for manufacturing formed articles by hot pressing or hot forming of the granulate, without the presence of a formaldehyde-containing adhesive and preferably without the presence of any other type of adhesive.

39 Claims, No Drawings

CHEMICALLY MODIFIED WOOD

FIELD OF THE INVENTION

The present invention relates to the field of chemically modified wood or some other cellulose-containing material, and more specifically to chemically modified pieces or particles which are possible to hot press or hot form in some other fashion into articles of different form, completely without using the formaldehyde adhesives which are much discussed these days. Apart from the pieces or particles being modified in such a manner as to permit said pressing or forming, they have also been found to be so stable that they can be stored and/or transported for a long time and then be hot formed or hot pressed into the desired article by the final user, i.e. quite independently of the factory in which the modified pieces or particles have been prepared. Therefore these particles will below be called a wood granulate since basically they are the equivalent of today's plastics granulates of different kinds, which are used for compression molding of plastic components. This leads to completely new fields of application for wood products.

The invention also relates to a method for preparing these granulates, and a method for manufacturing formed articles by hot pressing or hot forming of the granulates at issue.

BACKGROUND OF THE INVENTION

The prior-art technique for manufacturing kitchen fittings and, to some extent, also furniture products is to a considerable extent based on the use of particle board. The particle board products have appeared to be competitive by the relatively low price and suitability of the material for constructing geometrically simple configurations.

However, there are drawbacks of technical rather than economic nature, which in some cases are very annoying. The liberty in designing is highly restricted by the standard particle boards being made planar only and in large dimensions, which during manufacture are made into components which are planar as well. Besides, the particle board is brittle during drilling and edge processing, and instead of gluing, a special mechanical technique must be used for joining. Moreover, the dimensional stability and the resistance to moisture are unsatisfactory. Recently, the attention paid to the content of formaldehyde in the adhesive used in the particle board has pointed to the shortcoming of the particle board when requiring increased consideration of the environment and harmony with the ever increasing preference of the market for ecologically adapted products.

A substitute for particle boards which would permit that constructions, kitchen fittings and other interior fittings could be manufactured while taking greater liberty in aesthetical and designing respects, could be manufactured in a simpler way and at lower cost than the present technique and could be environmentally adapted to the market's wishes if full freedom from formaldehyde and other environmentally questionable chemicals would be of great interest to the industry manufacturing wooden articles.

Also for the construction and manufacture of dimensionally and moisture stable building products, fittings in cars and other vehicles, appliance enclosures, returnable packages etc., an ecological cellulose-based material permitting simple compression molding would be of interest to the market and be correct in these days.

The new chemically modified cellulose-based product according to the present invention has surprisingly been found to render the above possible. This is achieved by a specific combination of esterification of the hydroxy groups included in the material with a dicarboxylic acid anhydride, and treatment with a polyol, wherein the choice of the used reactants and especially their mutual quantities and how the chemical modification is carried out have been found to result in a product having good physical and chemical properties, which, as stated above, in many respects can be resembled to a plastics granulate in the respect that the inventive product functions as an intermediate product which is stable in storage and which can be formed by the final user quite separately from the original place of manufacture.

Before the invention is described in greater detail, it may be added in this context that the technique of esterifying the cellulose in wood with a dicarboxylic acid anhydride is per se known, for instance from Wood Sci.Technol. 22:21–32 (1988). The wood products described therein are, however, cross-linked with diallyl glycidyl ether which is very reactive and is obviously reacted with the remaining components fairly instantaneously. Therefore, the system can only be used in a conventional plant for making particle boards, i.e. the particle boards are pressed in immediate and direct connection with the chemically modified wood product. Moreover, according to this publication, a catalyst in the form of dicumyl peroxide is required, which yields a final product which is red or golden brown and has an unpleasant smell. Finally, it may be noted that allyl glycidyl ether is an expensive chemical, which is probably one of the reasons why this technique has not come into practical use, especially since the allyl glycidyl ether is used in an essentially greater amount than in the product according to the present invention.

The combination of maleic anhydride and glycerol is also known per se in connection with wood from the publication H. Fujimoto, K. Yamagishi, Chemical Treatment of Wood with a Maleic Acid and Glycerol Mixture. International Symposium on Chemical Modification of Wood, May 17–88, 1991, Kyoto, Japan. In this case, it is, however, a matter of reducing the swell of the wood when contacting water, the treatment being carried out with an aqueous solution of maleic anhydride and glycerol. In other words, maleic anhydride and glycerol are first allowed to react with one another, which occurs at about 100° C., whereupon the mixture is dissolved in water and sprayed onto the wood product. When manufacturing particle boards, particles are then sprayed with said solution, whereupon gluing with a phenol-formaldehyde adhesive and pressing are carried out in conventional manner. Although in this case a low thickness swell is obtained in connection with immersion in water, the disadvantages of the method are that the preparation of the mixture is carried out separately, that the product contains water which makes pressing difficult (vapor forms and may delaminate the particle product), and that the product must be glued with a formaldehyde-containing adhesive like in conventional particle board manufacture. An intermediate product which is stable in storage is therefore not obtained in this case either.

SUMMARY OF THE INVENTION

An object of the present invention is to provide, by chemical treatment of cellulose fibres, a chemically modified fibre in the form of a granulate which acts as an intermediate product which is stable in storage and which thus can be hot pressed or, in some other fashion, hot formed by the final user quite separately from the place of manufacture for the granulate at issue.

A further object of the invention is to provide a granulate which can be hot pressed or hot formed into an article of a more complicated configuration than a product of the particle board type.

One more object of the invention is to provide a granulate which can be hot pressed or hot formed into the desired configuration completely without using a formaldehyde-containing adhesive or some other type of adhesive.

A further object of the invention is to provide a granulate having such a chemical modification that it has excellent physical properties, such as good mechanical strength properties combined with an essentially reduced thickness swell in moist surroundings as compared to particle products of untreated wood.

A still further object of the invention is to provide a granulate which, when using a specific type of catalyst, results, in addition to quicker or better hardening and better mechanical properties, a brighter product than if a catalyst was not used.

One more object of the invention is to provide a granulate which can be hot pressed completely without addition of a catalyst.

Another object of the invention is to provide a method for preparing the above-mentioned wood granulate, the primary object thus being to provide a completely new intermediate product which can be further processed in a process completely separate from the chemical modification in time and space by subsequent compacting and forming.

A still further object of the invention is to provide a method for manufacturing formed articles of cellulose-based material by hot pressing or hot forming, in which it is possible to work completely without formaldehyde-containing adhesives or any other type of adhesive.

By the chemical modification according to the invention it is also possible to form such combinations of the included chemical substances that the following properties can be modified in a positive respect: surface hardness, surface evenness, elasticity and strength, creep properties, hydrophobicity and dimensional stability, homogeneity, fire resistance and appearance.

Other objects and advantages of the invention will be apparent to those skilled in the art from the more detailed description of the invention below.

DESCRIPTION OF THE INVENTION

The present invention thus relates, in a first aspect, to a granulate intended for manufacturing formed articles by hot pressing or hot forming, the granulate being characterised in that it comprises pieces or particles of wood or some other cellulose-containing material, whose hydroxy groups have been at least partially esterified with 10–50% by weight of a dicarboxylic acid anhydride and the pieces or particles of which have been impregnated with 2–25% by weight of a polyol having a hydroxyl functionality of at least 2, the amounts in both cases being based on the weight of the untreated pieces or particles, the granulate being hot pressable or hot formable into articles of any desired configuration and having cross-linked cellulose chains as it exists, i.e. without the presence of a formaldehyde-containing adhesive, if so desired after storage and/or transport.

The term "granulate" should in the present case be interpreted in a wide sense and is used in the first place to mark that the new chemically modified product according to the invention can be resembled to a plastics granulate in the sense that it represents an intermediate product which can be further processed at some other point of time and in some other place. In the invention, granulate therefore means each particle mass in the form of pieces, grains, particles etc., independently of whether these are obtained by disintegration of large units or pieces of material or by agglomeration of finely divided material. Also very finely divided material in itself, which is not agglomerated in any way, is therefore covered by the term in question. The term includes e.g. chips obtained by disintegration of timber, and of the kind that has been used conventionally for the manufacture of particle boards. The invention is, of course, not restricted to domestic species of wood, but functions for a variety of species of wood from other countries as well. Nor is it restricted to wood as material, but it may be used generally for all cellulose-containing materials. Thus, it may be a matter of pieces or particles of wood, of new fibres or recovered cellulose material, by which is meant both defibrated wood and wood powder composed of wood fibres, wood chips in different shapes or larger pieces, such as so-called wafers, strands, composed of wood fibres as well as waste paper, straw, bagasse and many other cellulose-containing materials which are possible to hot press or, in some other fashion, hot form into the desired articles.

The specific combination of a dicarboxylic acid anhydride and polyol of the stated type in the proportions as stated and used in the stated manner has thus been found to yield a product which, in spite of its being stable in storage for a long time, can still be hot pressed completely without supplying additional adhesive and, above all, completely without a formaldehyde-based adhesive and, besides, into a more complex form than merely planar boards. This is surprising in view of the prior-art technique which exists in the field that has been investigated for several decades and relates to the forming of wood and other cellulose-containing materials. Apart from environmentally interesting chemical substances being involved according to the invention, this also results in low costs in the manufacturing process.

Regarding the choice of dicarboxylic acid anhydride, this can in itself be made according to known principles for esterification of the hydroxy groups of the raw material, since this partial step in connection with the invention is per se known, even if it has not nearly been utilised in the advantageous manner that applies to the present invention. A preferred embodiment of the invention means, however, that a dicarboxylic acid anhydride is selected, which has a melting point below about 150° C., preferably below 120° C. A suitable range may be about 50–120° C. The upper limit is determined in the first place by the fact that in the esterification reaction, the temperature should not exceed about 150° C., since such a high temperature may cause decomposition and/or discoloration of the cellulose material. Besides, the reactivity of the dicarboxylic acid anhydride will affect the choice of a specific substance.

According to the invention, it has however been found that especially advantageous results are achieved if the dicarboxylic acid anhydride is one containing ethylenic unsaturation, an especially preferred example being maleic anhydride.

The amount of the dicarboxylic acid anhydride is preferably in the range 10–35, most advantageously 15–35% by weight, still based on the dry weight of the original cellulose material.

According to the invention, it has been found that a polyol having a hydroxyl functionality of at least 2, for instance 2, 3, 4, 5 or 6, results in the above-described combination of good stability at temperatures about room temperature and sufficient reactivity at the temperatures used for hot pressing or hot forming of the finished articles. The polyol preferably has a melting point below about 200° C., for instance below 120° C. Diols, triols or tetraols have appeared to be of interest. A preferred example of a triol is glycerol, above all because of the expense and from the environmental point of view. Another example of a usable triol is trimethylpropane. Suitable examples of diols are propanediol, 1,4-bis(hydroxymethyl)cyclohexane and polyethylene glycol.

An especially preferred amount of the polyol is 2–20% by weight, most advantageously 5–15% by weight, said amount also being calculated on the same basis as before, i.e. the weight of the original dry material.

Even if the new granulate according to the invention has been found to function well for hot pressing completely without a catalyst, a preferred embodiment of the invention is, however, represented by the use of a special type of catalysts, viz. a catalyst selected from the group consisting of phosphates, especially hydrogen phoshates, of alkali metals and acetates of alkali metals and of ferrous metals. By alkali metal is meant above all sodium and potassium, and by ferrous metals are meant iron, cobalt and nickel, especially cobalt. Especially preferred catalysts are disodium hydrogen phosphate and sodium dihydrogen phosphate and corresponding potassium compounds as well as sodium and potassium acetate. In addition to their yielding quicker or better hardening or cross-linking of the cellulose and the resultant improved mechanical properties, they have surprisingly been found to yield a product which is brighter or whiter than the corresponding product with no catalyst, which renders new fields of application possible for making articles of hot-pressed wood particles.

However, the invention does of course not exclude the use of catalysts of some other type for providing quicker or better cross-linking reactions.

In the use of a catalyst, a preferred range of this is 0.1–10, still more preferred 0.5–8 and most advantageously 2–6, % by weight, based on the weight of the untreated pieces or particles.

In a second aspect of the invention, a method is provided for preparing the above-described granulate, said method implying in general that the pieces or particles are esterified with the dicarboxylic acid anhydride at a temperature in the range 80–160° C. and subsequently the esterified pieces or particles are impregnated with the polyol having a hydroxyl functionality of at least 2 at a temperature from room temperature up to 150° C.

The preferred embodiments that have been discussed above in connection with the granulate apply, of course, also in connection with this method and therefore need not be repeated here.

The important thing in the invention thus is that in a first step, the esterification reaction is carried out and only then the polyol is added, such that the latter basically does not react with the dicarboxylic acid anhydride or at least not completely on this occasion, but instead basically impregnates the pieces or particles for later activation during hot pressing or hot forming to the desired article.

A particularly preferred temperature range for the esterification reaction is 100–120° C., which also indirectly means that the highest temperature for impregnation with polyol suitably is 120° C. However, the impregnation with the polyol can advantageously be effected at a considerably lower temperature than in the esterification reaction, thus making it a matter of impregnation only and not a matter of substantial reaction.

The reaction time for the esterification reaction is preferably in the range from 5 min up to 5 h, more specifically 30 min to 2 h, depending on the temperature used.

The impregnation is more dependent on how efficient the mixing process is, but in general it may suitably be carried out during a period of time of from 5 min to 5 h, especially from 10 min to 3 h.

Although the invention is in no way restricted to special reaction mechanisms, the first step of the method will imply that a substantial amount of the hydroxyl groups of, in the first place, the cellulose reacts with the dicarboxylic acid anhydride and blocks these groups in the form of ester groups for the subsequent reaction with water molecules. This results in the cellulose becoming permanently swollen and a further swell, when contacting water, being reduced.

When the substantial esterification reaction is estimated to be finished, the esterified product is mixed with the polyol, which implies, for instance, that the polyol is dropped or sprayed over the esterified pieces or particles.

If a phosphate or acetate of the type stated above is used as catalyst, this should suitably be added to the pieces or particles from the very beginning, i.e. even before they are esterified with the dicarboxylic acid anhydride, since this has been found to give optimum results.

In a further aspect of the invention, a method is provided for manufacturing formed articles by hot pressing or some other hot forming, said method being characterised by hot pressing or hot forming the above-described granulate into the desired configuration without the presence of a formaldehyde-containing adhesive and preferably without the presence of any other adhesive.

The preferred embodiments regarding materials, contents and the like, which have been discussed above, of course also apply to this case and need not be repeated once more.

However, it may be mentioned that hot pressing is preferably carried out at a temperature in the range 120–200° C., preferably 150–180° C. As for the rest, the hot pressing is carried out according to principles known per se, i.e. in the first place known from the technical field of making particle board of fibreboard. In more complex configurations of the manufactured articles, which is a new and most interesting aspect of the present invention, methods from the plastic field can basically be applied, and therefore also this part of the process need not be elucidated in greater detail here. It is also apparent from what has been said above that forming need not necessarily comprise any pressing or compacting step, but it may be a pure forming operation without application of pressure and merely during heating to the desired temperature for the final hardening to occur. Also this method is per se known and need not be further described here.

EXAMPLES

The invention will now be elucidated by a number of Examples concerning the preparation of the new wood granulate according to the invention and its use when manufacturing formed articles. These Examples are of course given for the purpose of exemplification only and are not restrictive to the invention in any other respect than that appearing from the claims.

Example 1

This experiment was carried out in a 1000 ml glass reactor fitted with agitator, thermometer, dropping funnel and reflux cooler. Heating was carried out in a thermostatted oil bath. The used cellulose-containing material consisted mainly of redwood chips and was dried before the synthesis.

The chips were added in an amount of 70 g together with maleic anhydride to the glass reactor and was allowed to react at 120° C. for 30 min, whereupon drops of glycerol were added and admixed at substantially the same temperature as in said reaction.

After 2 h, the reactor was emptied and test boards were manufactured from the reacted and impregnated wood chips at a pressing temperature of 170° C. and a pressing time of 10 min.

On these boards, the modulus of elasticity and breaking stress were determined by a three-point bending test in Alwetron, the boards being conditioned at 50% RH and 23° C. Moreover, the dimensional change was determined by measuring at 10 measuring points for each sample of the thickness in dry state and in humidified state (immersed in water for 24 h) and comparison with a conventionally glued particle board.

The results are presented in Table 1.

TABLE 1

| Amount MA + Gl Ma g + Gl g (per 70 g wood) | Modulus of elasticity MPa | Breaking stress MPa | ASE % |
|---|---|---|---|
| 22 + 4 | 4950 | 20 | 52 |
| 24 + 6 | 4965 | 21 | 58 |
| 18 + 6 | 4000 | 17 | 41 |

MA = Maleic anhydride
Gl = Glycerol
ASA = (1-(dimensional change sample/dimensional change ref) × 100)%

Example 2

The same conditions as in Example 1, except that a catalyst was added. The catalyst was sprayed in the form of an aqueous solution over the chips from the beginning, whereupon the water was allowed to dry up. The results are presented in Table 2.

TABLE 2

| Amount MA + Gl (per 70 g wood) | Modulus of elasticity | Breaking stress | ASE | Catalyst |
|---|---|---|---|---|
| 18 + 6 | 5400 | 25 | 64 | $Na_2HPO_4$(4 g/100 g wood) |
| 22 + 4 | 5200 | 31 | 61 | KAc(4 g/100 g wood) |
| 22 + 4 | 5600 | 29 | 70 | NaAc(4 g/100 g wood) |
| 22 + 4 | 5500 | 27 | 63 | $NaH_2PO_4$(4 g/100 g wood) |

Example 3

The same conditions as in the above Examples, but using other polyols than glycerol. The results are presented in Table 3.

TABLE 3

| Amount MA + polyol (per 70 g wood) | Modulus of elasticity | Breaking stress | ASE | Catalyst |
|---|---|---|---|---|
| 22 + 7, 6 TMP | 3400 | 16 | 39 | — |
| 22 + 4 TMP | 5500 | 26 | 57 | 4 g $Na_2HPO_4$/100 g wood |
| 22 + 7 PEG | 4400 | 21 | 73 | 4 g KAc/100 g wood |
| 22 + 4 propanediol | 4000 | 17 | 62 | — |
| 22 + 6 | 4600 | 23 | 73 | 4 g KAc/100 g wood |

1,4 bis(hydroxymethyl)cyclohexane
TMP = Trimethylolpropane
PEG = Poly(ethylene glycol) (=PEG 400)

Example 4

The same conditions as in the previous Examples, but the material being dustlike wood powder. The results are presented in Table 4.

TABLE 4

| Amount MA + Gl (per 70 g wood) | Modulus of elasticity | Breaking stress | ASE | Catalyst |
|---|---|---|---|---|
| 22 + 4 | 5200 | 31 | 68 | — |
| 22 + 4 | 5500 | 35 | 76 | $Na_2HPO_4$(4 g/100 g wood) |
| 22 + 4 | 6000 | 40 | 72 | KAc(4 g/100 g wood) |

Example 5 (Comparison)

Reference samples were made of wood chips of the same origin as in the previous experiments. 20% UF adhesive was admixed and test boards were pressed, pressing time 10 min and pressing temperature 170° C. The number of reference samples was 8. (UF=urea formaldehyde resin). The results are presented in Table 5.

TABLE 5

| Modulus of elasticity MPa | Breaking stress MPa | Thickness swell % |
|---|---|---|
| 3800 | 24 | 45 |

Example 6

1. A wood granulate prepared in the manner described in Example 1 was stored for three months at normal room temperature, whereupon test boards were pressed, pressing time 10 min and pressing temperature 170° C. The wood granulate contained 18 g MA/70 g wood and 6 g Gl/70 g wood. The test boards were of the same shape and appearance as directly pressed test boards of the same composition as the stored wood granulate, and the properties had not changed.

2. A wood granulate composed of 22 g MA/70 g wood, 4 g GL/70 g wood and 4 g KAc/100 g wood was stored for one month under the same conditions as above. Test boards were pressed and compared with directly pressed test boards of the same composition, and no difference could be seen.

Example 7

A great disadvantage of conventional particle boards is that grooves cannot be milled in their surface. It is possible to mill grooves in MDF boards, but normally they must be polished in order to obtain a satisfactory surface finish before the surface treatment.

A groove of a depth of 2 mm and a width of 8 mm was milled in a test board made of a wood granulate of the composition: 22 g MA/70 g wood and 4 g GL/70 g wood according to the invention. The milling machine was a Milko-35r and the speed 1280 rpm. A comparison with milled grooves in MDF board showed that the surface finish of the milled groove in the test board according to the invention was considerably better.

We claim:

1. A granulate for manufacturing formed articles by thermal pressing or thermal forming, comprising pieces or particles of wood or some other cellulose-containing material, whose hydroxy groups have been at least partially esterified with 10–50% by weight of a dicarboxylic acid anhydride and which have been impregnated with 2–25% by weight of a polyol having a hydroxyl functionality of at least 2, the amount in both cases being based on the weight of the untreated pieces or particles, the granulate being thermal pressable or thermal formable into articles of any desired configuration and having cross-linked cellulose chains without the presence of a formaldehyde-containing adhesive or some other type of adhesive.

2. The granulate as claimed in claim 1, wherein the amount of dicarboxylic acid anhydride is 10–35% by weight.

3. The granulate as claimed in claim 2, wherein the amount of polyol is 2–20% by weight.

4. The granulate as claimed in claim 3, wherein the amount of polyol is 5–15% by weight.

5. The granulate as claimed in claim 2, wherein the dicarboxylic acid anhydride is one having a melting point below about 150° C.

6. The granulate as claimed in claim 5, wherein the dicarboxylic acid anhydride is one having a melting point below about 120° C.

7. The granulate as claimed in claim 5, wherein the dicarboxylic acid anhydride is one having a melting point in the range of 50–120° C.

8. The granulate as claimed in claim 2, wherein the amount of dicarboxylic acid anhydride is 15–35% by weight.

9. The granulate as claimed in claim 1, wherein the amount of polyol is 2–20% by weight.

10. The granulate as claimed in claim 9, wherein the amount of polyol is 5–15% by weight.

11. The granulate as claimed in claim 1, wherein the dicarboxylic acid anhydride is one having a melting point below about 150° C.

12. The granulate as claimed in claim 11, wherein the dicarboxylic acid anhydride is one having a melting point below about 120° C.

13. The granulate as claimed in claim 11, wherein the dicarboxylic acid anhydride is one having a melting point in the range of 50–120° C.

14. The granulate as claimed in claim 1, wherein the dicarboxylic acid anhydride is one containing ethylenic unsaturation.

15. The granulate as claimed in claim 14, wherein the dicarboxylic acid anhydride is maleic anhydride.

16. The granulate as claimed in claim 1, wherein the polyol has a melting point below about 200° C.

17. The granulate as claimed in claim 16, wherein the polyol is glycerol.

18. The granulate as claimed in claim 16, wherein the polyol is a diol, triol or tetraol.

19. The granulate as claimed in claim 1, wherein it also contains a catalyst for the cross-linking of the cellulose chains.

20. The granulate as claimed in claim 19, wherein the catalyst is selected from the group consisting of phosphates of alkali metals and acetates of alkali metals and of iron, cobalt and nickel.

21. The granulate as claimed in claim 20, wherein the catalyst is a dialkali metal hydrogen phosphate or alkali metal dihydrogen phosphate, or sodium or potassium acetate.

22. The granulate as claimed in claim 21, wherein the catalyst is disodium hydrogen phosphate or sodium dihydrogen phosphate.

23. The granulate as claimed in claim 19, wherein the amount of catalyst is 0.1–10% by weight based on the weight of the untreated particles or pieces.

24. The granulate as claimed in claim 19, wherein the amount of catalyst is 0.5–8% by weight based on the weight of the untreated particles or pieces.

25. The granulate as claimed in claim 19, wherein the amount of catalyst is 2–6% by weight based on the weight of the untreated particles or pieces.

26. The granulate as claimed in claim 1, wherein it consists of chips or powder obtained by disintegration of wood.

27. Method for preparing a granulate as claimed in claim 1, comprising esterifying the pieces or particles with the dicarboxylic acid anhydride at a temperature in the range of 80–160° C. and subsequently impregnating the esterified pieces or particles with the polyol having a hydroxyl functionality of at least 2 at a temperature from room temperature up to 150° C.

28. The method as claimed in claim 27, wherein the esterification reaction is carried out during a reaction time of from 5 min to 5 h.

29. The method as claimed in claim 28, wherein the esterification reaction is carried out during a reaction time of from 30 min to 2 h.

30. The method as claimed in claim 27, wherein the impregnation with the polyol is carried out during a period of from 5 min to 5 h.

31. The method as claimed in claim 30, wherein the impregnation with the polyol is carried out during a period of from 10 min to 3 h.

32. A method for manufacturing formed articles of wood or some other cellulose-containing material, comprising thermal pressing or thermal forming a wood granulate prepared by the method as claimed in claim 27 into the desired configuration without the presence of a formaldehyde-containing adhesive.

33. The method as claimed in claim 32, wherein the thermal pressing or thermal forming is without the presence of a formaldehyde-containing adhesive and without the presence of any other type of adhesive.

34. The method as claimed in claim 27, wherein esterification of the pieces or particles with the dicarboxylic acid anhydride is at a temperature in the range of 100–120° C.

35. The method as claimed in claim 27, wherein impregnation of the esterified pieces or particles with the polyol is at a temperature from room temperature up to 120° C.

36. A method for manufacturing formed articles of wood or some other cellulose-containing material, comprising thermal pressing or thermal forming a wood granulate as claimed in claim 1, into the desired configuration without the presence of a formaldehyde-containing adhesive.

37. The method as claimed in claim 36, wherein thermal pressing or thermal forming is carried out at a temperature in the range 120–200° C.

38. The method as claimed in claim 37, wherein thermal pressing or thermal forming is carried out at a temperature in the range of 150–180° C.

39. The method as claimed in claim 36, wherein the thermal pressing or thermal forming is without the presence of a formaldehyde-containing adhesive and without the presence of any other type of adhesive.

* * * * *